BOLTED CONTACT SWITCH WITH CAM MEANS FOR OVERCOMING MAGNETIC PINCH FORCES ON CONTACT BLADES

Original Filed Feb. 26, 1973 2 Sheets-Sheet 1

United States Patent Office

Re. 28,243
Reissued Nov. 12, 1974

28,243

BOLTED CONTACT SWITCH WITH CAM MEANS FOR OVERCOMING MAGNETIC PINCH FORCES ON CONTACT BLADES

Tadeusz J. Rys, Edgewood, Ky., assignor to Square D Company, Park Ridge, Ill.

Original No. 3,787,654, dated Jan. 22, 1974, Ser. No. 336,147, Feb. 26, 1973. Application for reissue Apr. 1, 1974, Ser. No. 457,044
Int. Cl. H01l *1/50*
U.S. Cl. 200—256 8 Claims

Matter enclosed in heavy brackets [ ] appears in the original patent but forms no part of this reissue specification; matter printed in italics indicates the additions made by reissue.

ABSTRACT OF THE DISCLOSURE

Two flat movable contact blades are mounted adjacent first ends thereof in spaced parallel relationship respectively on opposite sides of a flat stationary mounting blade for edgewise pivotal movement of their other end portions into and out of engagement respectively with opposite sides of a flat stationary contact blade aligned with the mounting blade. Threaded stud and nut clamping means are provided for automatically clamping the movable contact blades adjacent opposite ends respectively to the mounting blade and to the stationary contact blade after the movable contact blades reach a fully closed position. Cam means carried by the movable contact blades overcomes static friction and high mangetic forces to prevent welding of the blades in closed position upon flow of excessively high currents.

Upon flow of excessively high currents, the attractive force between two movable contact blades of each pole of a bolted-contact switch can be so great as to cause them to grip the stationary contact blade so tightly that they fail to open, even through an automatic tripping means has moved a latch for the opening springs of a stored-energy switch operating mechanism to an unlatching position and the threaded stud and nut clamping means for the blades has been operated in an unclamping direction.

An object of the invention is to provide a bolted contact switch having cam means for overcoming the magnetic pinching force of each pair of movable contact blades upon their respective stationary contact blade.

Other objects and advantages will become apparent when the following specification is considered along with the accompanying drawings in which.

Figure 5:
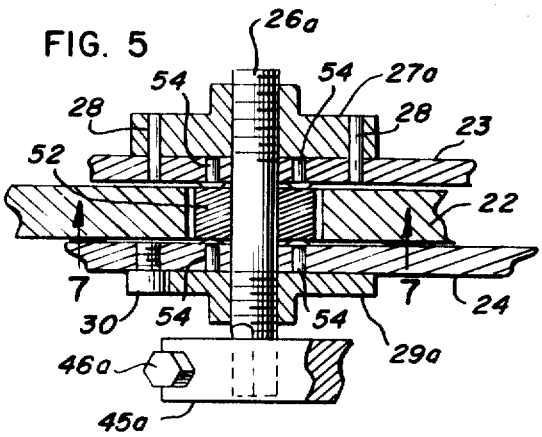
FIG. 5 is a fragmentary sectional view taken generally along the line 5—5 of FIG. 2.
Figure 6:
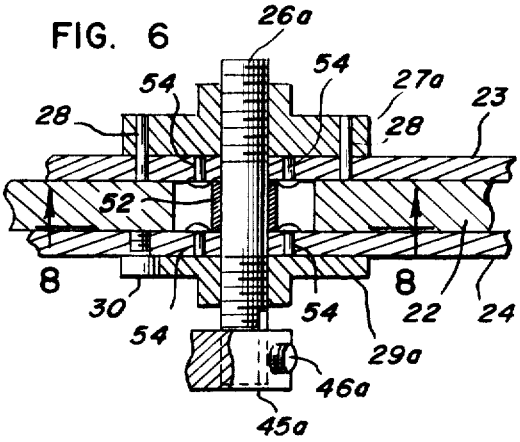
FIG. 6 is a fragmentary sectional view taken generally along the line 6—6 of FIG. 3.

With reference to the drawings, FIGS. 1–4 show a set 18 of blades of a bolted contact switch, including a stationary mounting blade 20, a stationary contact blade 22 spaced endwise from and aligned with the mounting blade 20, and a pair of movable contact blades 23 and 24 (FIG. 4) pivotally mounted on the mounting blade 20. The blades 23 and 24 are provided with conventional "bolted contact means," or clamping means for clamping the blades 20 and 22 therebetween in their closed position. The clamping means includes a rotatably mounted stud 26a extending through suitable apertures provided respectively in the free end portions of the blades 23 and 24 and having oppositely threaded opposite end portions, as shown in FIGS. 5 and 6. A nut 27a is threaded on an end portion of the stud 26a adjacent an outer side of the blade 23 and locked against rotation relatively to the blade 23 by a pair of pins 28 frictionally held respectively in suitable apertures provided in the nut 27a and extending respectively into suitable aligned apertures provided in the blade 23. A nut 29a is threaded on an end portion of the stud 26a adjacent an outer side of the blade 24 and locked against rotation relatively to the blade 24 by a socket-head screw 30 threaded into the blade 24 and having a socket-head portion partially received within one scallop of a scalloped peripheral portion of the nut 29a.

The clamping means as thus far described is duplicated at the pivoted end portions of the blades 23 and 24 and includes a stud 26b extending through suitable apertures provided in the blades 20, 23, and 24 and a pair of oppositely threaded nuts 27b and 29b respectively identical to the stud 26a and the pair of nuts 27a and 29a.

A drive pin 32 is mounted in suitable apertures provided respectively in the blades 23 and 24, and a drive link 33 is pivotally mounted on an end portion of the pin 32 adjacent the outer side of the blade 24. A crossbar 34 is secured to the drive link 33 by a pair of screws 35 and is similarly secured to other drive links for movable contact blades of other poles of the switch. The crossbar 34 may be driven by operating mechanism such as that disclosed in my copending application, Ser. No. 329804 filed on Feb. 5, 1973.

Figure 1:
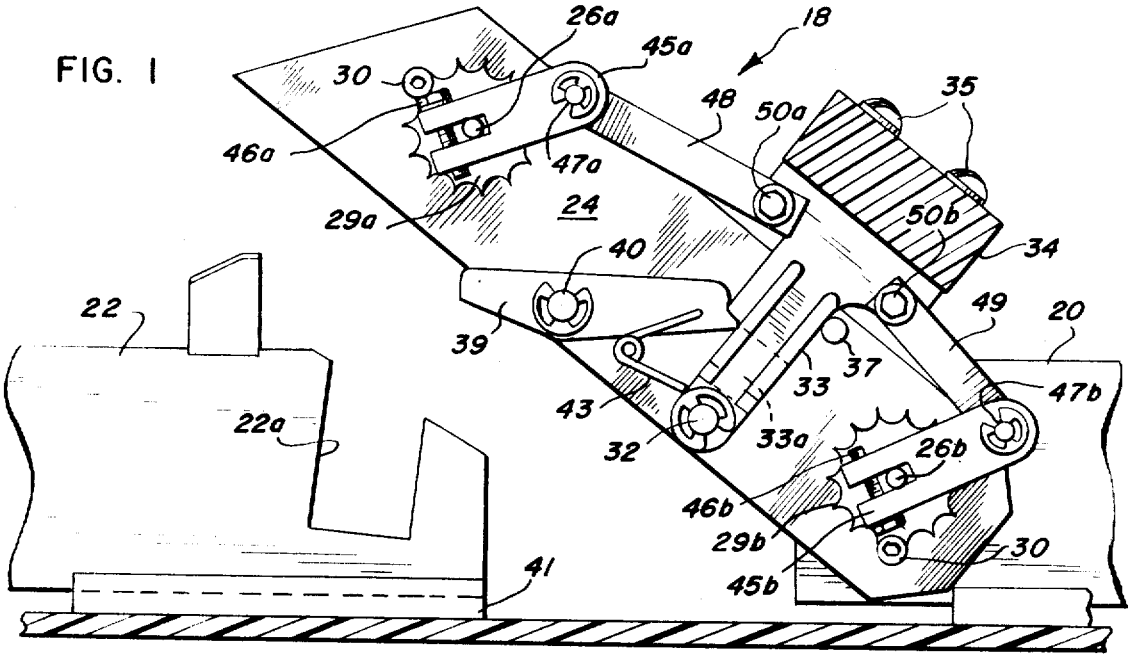
FIG. 1 is a side view of one pole of a bolted contact switch constructed in accordance with the invention, a pair of movable contact blades being shown in an open position.
Figure 2:
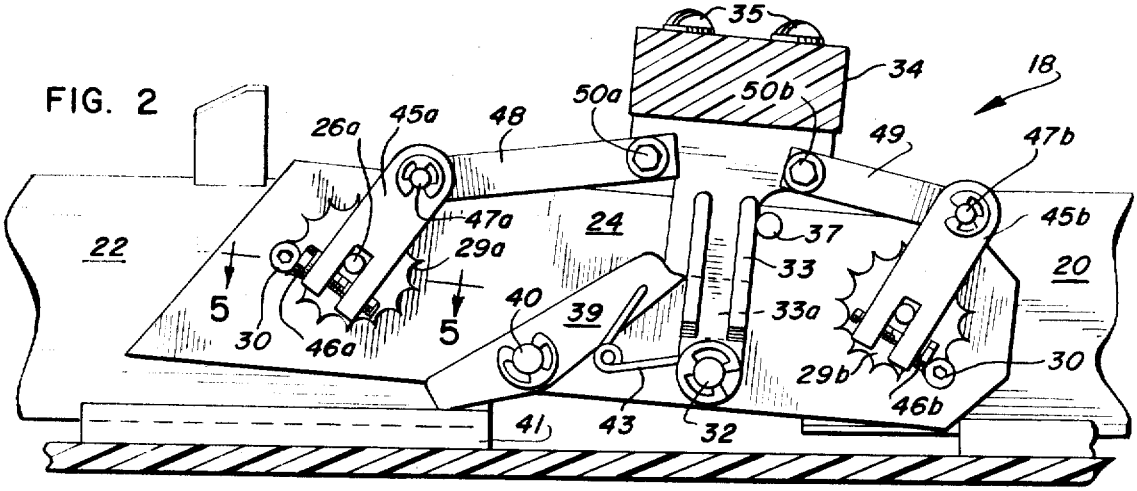
FIG. 2 is a view similar to FIG. 1, but showing the movable contact blades in an almost fully closed position.
Figure 3:
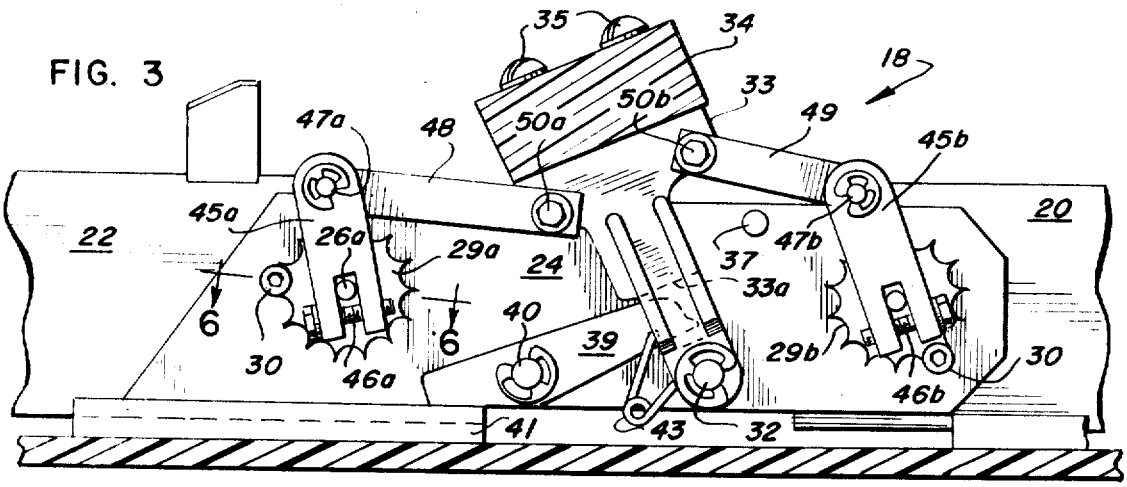
FIG. 3 is a view similar to FIG. 2, but showing the movable contact blades in fully closed and bolted position.
Figure 4:
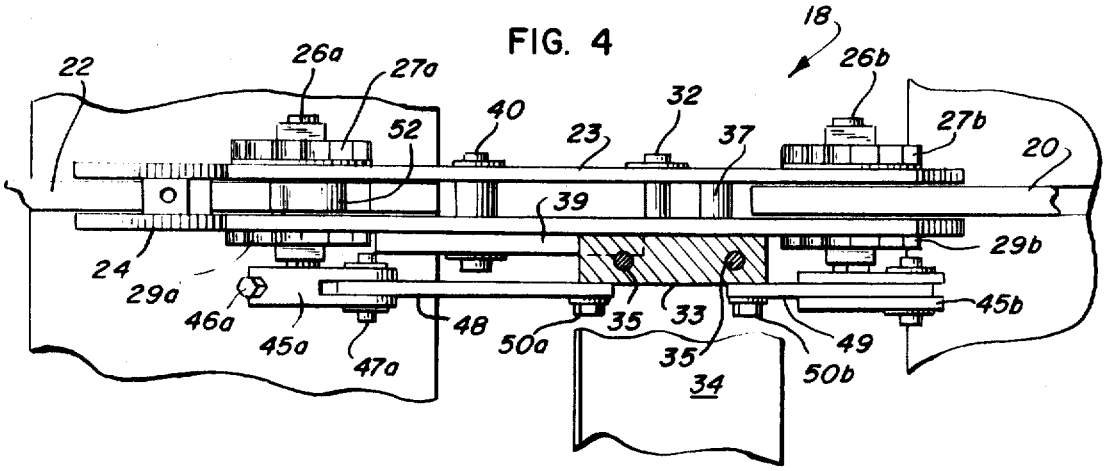
FIG. 4 is a view partially in section, taken from the top of FIG. 2.

A stop pin 37 mounted in suitable apertures provided in the blades 23 and 24 projects outwardly from the blade 24 and limits clockwise pivotal movement of the drive link 33 with respect to the blades 23 and 24, as viewed in FIG. 1–3. Counter-clockwise pivotal movement of the drive link 33 with respect to the blades 23 and 24 is limited in open positions of the blades by a releasable latch member 39 pivotally mounted on an outer end portion of a pin 40 disposed in suitable apertures provided in the blades 23 and 24. The drive link 33 is provided with a recess 33a adjacent the drive pin 32 on the side facing the blade 24, and when the latch member 39 is pivoted clockwise as viewed in FIG. 2 upon movement of the blades 23 and 24 to fully closed position and engagement of an actuating end portion of the latch member 39, opposite from a latching end portion thereof adjacent the drive link 33, with a mounting plate 41 for the blade 22, the drive link 33 is released and passes over the latching end portion of the latch member 39, which is received in the recess 33a. After the release of the drive link 33, counter-clockwise movement thereof with respect to the blades 23 and 24, from the position of FIG. 2 to the position of FIG. 3, is limited by engagement of the cross-bar 34 with the blades 23 and 24.

Upon subsequent movement of the blades 23 and 24 to open position, the drive link 33 is pivoted clockwise back into engagement with the stop 37 and the latch member 39 is pivoted back to the latching position of FIGS. 1 and 2 by a torsion spring 43 having one end portion anchored on the pin 32 and the other end portion anchored in the latch member 39.

A forked end portion of a crank member 45a is fixedly secured to a flattened outer end portion of the stud 26a by a screw 46a. An opposite end portion from that secured to the stud 26a is pivotally connected by a pin 47a to one end portion of a connecting link 48 having its other end portion pivotally connected to the drive link 33 by a screw 50a. Similarly, a crank member 45b is fixedly secured to a flattened end portion of the stud 26b by a screw 46b. A pin 47b pivotally connects the crank member 45b to one end portion of a connecting link 49 having its other end portion pivotally connected to the drive link 33 by a screw 50b. The crank members 45a and 45b respectively turn the studs 26a and 26b upon pivotal movement of the drive link 33 relatively to the blades 23 and 24. Because the studs are oppositely threaded adjacent opposite ends, their turning respectively moves the pair of nuts 27a and 29a and the pair of nuts 27b and 29b closer together or farther apart, thus clamping or unclamping the blades 20 and 22 between the blades 23 and 24.

Upon flow of excessively high currents, the magnetic attraction force between the two movable contact blades 23 and 24 can be so great as to prevent opening thereof by an automatic tripping means, even when the studs 26a and 26b have been turned to an unclamping position for the blades. In accordance with the invention, a cam member 52 (FIGS. 4–8) provided with a suitable aperture is mounted on the stud 26a between the blades 23 and 24 and is prevented from rotating relatively to the stud by a key 53. Further, the blade 23 is provided with suitable apertures in which two spaced pins 54 are respectively mounted. The pins 54 have rounded head portions projecting from an inner surface of the blade for cooperation with the cam member 52. If desired, the blade 24 may be provided with a similar pair of pins 54. The stationary contact blade 22 is normally provided with a slot 22a (FIGS. 1, 7, and 8) for receiving the stud 26a. In accordance with the invention, the slot 22a is enlarged so as to be able to receive the cam member 52 also.

Figure 8:
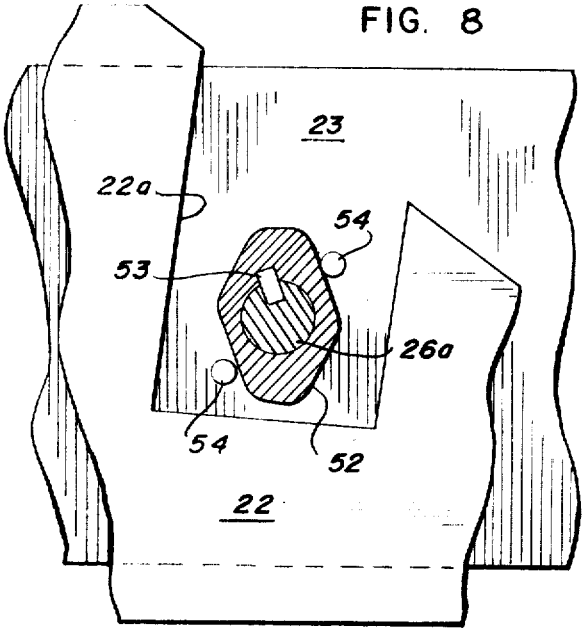
FIG. 8 is a fragmentary sectional view taken generally along the line 8—8 of FIG. 6.
Figure 7:
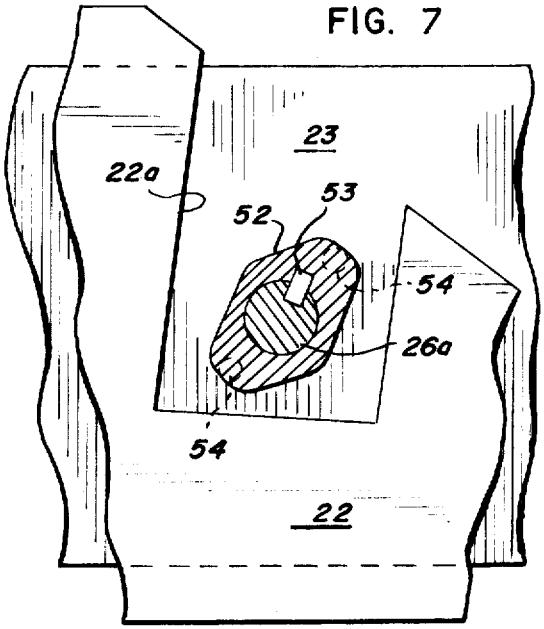
FIG. 7 is a fragmentary sectional view taken generally along the line 7—7 of FIG. 5.

When the stud 26a is turned from the unclamping position of FIGS. 5 and 7 to the clamping position of FIGS. 6 and 8, the cam member 52 rides off the rounded head portions of the pins 54 so as not to interfere with clamping. When the reverse movement takes place to relieve the clamping pressure of the nuts 27a and 29a on the blades 23 and 24, the cam member 52 rides onto the rounded head portions of the pins 54 and forces the blades 23 and 24 apart, as best shown in FIG. 5. The force exerted by the cam member 52 is sufficient to overcome the magnetic pinching force on the blade 22 due to excessively high current flow through the blades 23 and 24. For example, the provision of the cam member 52 and pins 54 enabled a switch rated at four thousand amperes to pass a test at twelve times rating, or 48,000 amperes, whereas a switch without the cam member 52 and pins 54 failed to open at 48,000 amperes.

Various modifications may be made in the structure shown and described without departing from the spirit and scope of the invention.

I claim:

1. In a bolted contact switch having clamping means including a [pivotally mounted] threaded stud [and a pair of nuts carried by] *pivotally mounted between* a pair of spaced movable contact blades, *threaded means to receive said stud, said threaded means being operatively associated with at least one of said spaced contact blades* for clamping a stationary contact blade therebetween, cooperative cam means [fixedly] mounted respectively on the threaded stud of the clamping means between the movable contact blades and on at least one of the movable contact blades and operable to force the movable contact blades apart when the stud is pivoted in an unclamping direction.

*2. A bolted contact switch as claimed in claim 1 wherein at least one of said movable contact blades has a pin mounted therein, said pin having a rounded head portion, a cam member mounted on said threaded stud, said cam member in cooperation with said rounded head portion of the pin comprising said cam means.*

*3. A bolted contact switch as claimed in claim 1 wherein each of the said movable contact blades is provided with a cam surface cooperable with a cam member mounted on said threaded stud.*

*4. A bolted contact switch as claimed in claim 3 wherein each of the movable contact blades has a pin mounted therein, said pin having a rounded head portion providing the cam surface.*

*5. A bolted contact switch as claimed in claim 1 wherein each of the movable contact blades is provided with a pair of spaced cam surfaces.*

*6. A bolted contact switch as claimed in claim 5 wherein the spaced cam surfaces of each movable contact blade are disposed respectively on opposite sides of a pivotal axis of the threaded stud and cam member mounted thereon.*

*7. A bolted contact switch as claimed in claim 6 wherein each of the movable contact blades has a pair of pins mounted therein, said pins each having a rounded head portion providing one of the cam surfaces.*

*8. A bolted contact switch as claimed in claim 5 wherein each of the movable contact blades has a pair of pins mounted therein, the pins each having a rounded head portion providing one of the cam surfaces.*

References Cited

The following references, cited by the Examiner, are of record in the patented file of this patent or the original patent.

UNITED STATES PATENTS

| | | | |
|---|---|---|---|
| 3,193,632 | 7/1965 | Spragne | 200—48 KB |
| 3,248,509 | 4/1966 | McCloud | 200—48 KB |
| 2,787,690 | 4/1957 | Fallows | 200—48 KB X |
| 2,647,183 | 7/1953 | Wallace et al. | 335—14 |
| 2,363,287 | 11/1944 | Bayer | 200—170 A |
| 2,288,134 | 6/1942 | Hoye | 200—48 KB X |
| 1,929,049 | 10/1933 | Austin | 200—170 A |

ROBERT K. SCHAEFER, Primary Examiner

W. J. SMITH, Assistant Examiner

U.S. Cl. X.R.

200—48 KB